United States Patent Office 3,352,934
Patented Nov. 14, 1967

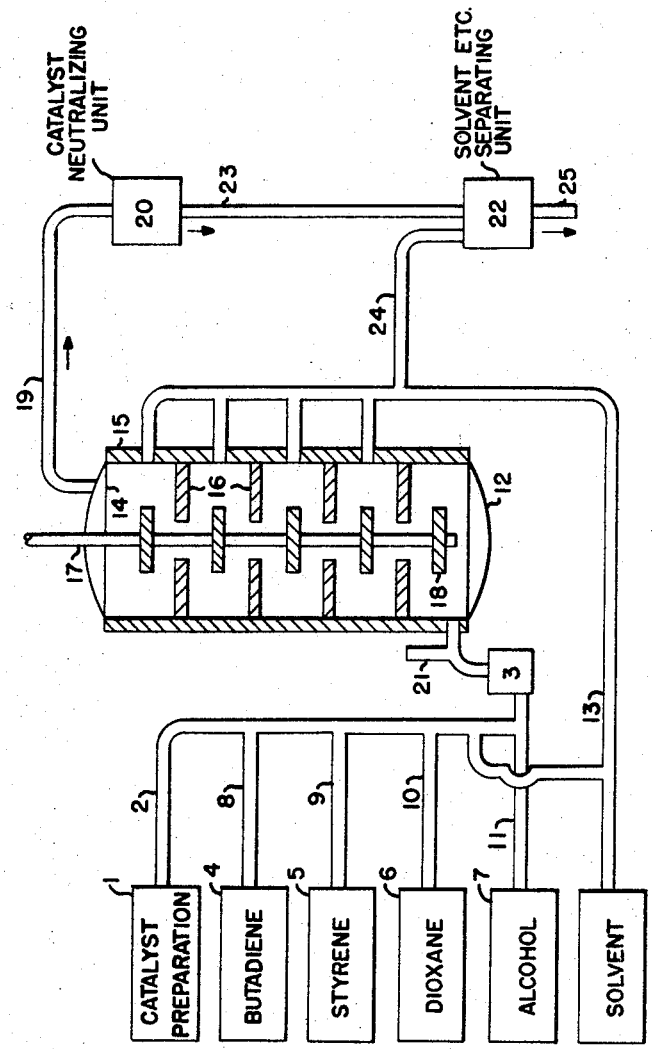

3,352,934
USE OF HYDROGEN AS A MOLECULAR WEIGHT CONTROL IN ALKALI-METAL POLYMERIZATION OF DIOLEFINS
William Thomas Heuse and Richard Louis Ray, Baton Rouge, La., and Wayne Hoover, Alexandria, Va., assignors to Esso Research and Engineering Company, a corporation of Delaware
Filed Nov. 6, 1964, Ser. No. 412,581
6 Claims. (Cl. 260—669)
(Filed under Rule 47(a) and 35 U.S.C. 116)

ABSTRACT OF THE DISCLOSURE

The molecular weight of liquid copolymers of butadiene and styrene prepared by solution polymerization in the presence of alkali metal catalyst is controlled by the addition of hydrogen to the polymerization system.

---

This invention relates to an improved process for the alkali-metal polymerization of diolefins and more particularly relates to a method for controlling the molecular weight of the diolefin polymers.

The polymerization of conjugated diolefins, such as 1,3-butadiene with or without comonomers, such as a vinyl aromatic hydrocarbon, e.g., styrene, in the presence of an alkali metal catalyst in the presence or absence of a solvent is well known. Solid or liquid products may be produced using these catalysts. Liquid products are favored by the use of a solvent, moderate temperatures and small amounts of finely dispersed catalyst in a system in which the feed materials are continuously introduced into a staged reactor and product is withdrawn from the final stage. Such a process is described in U.S. Patent No. 2,849,510, issued Aug. 26, 1958, to Stanley E. Jaros and Joseph F. Nelson. A modification of this process is described in U.S. Patent No. 2,791,618, issued May 7, 1957, to James E. Moise and Marnell A. Segura. The polymers produced by the above processes range in viscosity from about 0.5 to 20 poises measured as a 50% solution in Varsol. Generally, however, the viscosities will run between 1 and 10 poises. The molecular weight corresponding to these viscosities range between 2800 and 5500. For many purposes, as in the preparation of solventless coatings, a lower molecular weight polymer, i.e., within the range of 500 and 4500, is desirable. This can be done by increasing the catalyst concentration but this increases the cost of the process both because of the initial cost of the catalyst and the added cost of its removal.

In accordance with this invention it has now been found that the molecular weight of the polymer may be controlled within any desired range by the addition of a controlled amount of hydrogen to the polymerization reaction.

In a specific embodiment of this invention, a plurality of vessels are used as reactors. Each vessel is equipped with an agitator and inlets for the introduction of reactants, solvent and catalyst. The initial charge is introduced to the first vessel in the series and the product is withdrawn from the last. In the initial vessel the catalyst, monomers, solvent, modifier, catalyst activator are introduced. Additional amounts of solvent may be introduced into the second and/or succeeding vessels in the series. The polymer solution withdrawn from the final stage is fed to a polymer separation system where the catalyst is removed from the crude reaction product by filtration through Attapulgus clay or other clay containing 1 to 25% bound water. The catalyst-free product is then treated to remove the solvent, modifiers, etc., which are recycled to the reactor.

In order to illustrate a specific embodiment of the process of this invention, reference is had to the accompanying drawing, which is a diagrammatic representation of one method of carrying out this invention. In the description reference is had to specific comonomers and also to a specific design and arrangement of equipment. It is to be understood, however, that variations in both materials and equipment may be made without departing from the scope of the disclosure.

A finely divided suspension of alkali metal catalyst, for example, sodium in Varsol, from catalyst preparation vessel 1, is introduced by line 2 into mixer 3. Simultaneously butadiene or other conjugated diolefin from tank 4, styrene or other vinyl aromatic hydrocarbon from tank 5, dioxane or diethyl ether or other ether from tank 6 and isopropyl or other alcohol from tank 7 are passed by lines 8, 9, 10, and 11, respectively into mixer 3 and introduced into the lower most stage of reactor 12. Varsol solvent from line 13 is introduced to each of the second and succeeding stages of the reactor as needed.

The reactor itself consists of a large vessel 14 surrounded by cooling jacket 15 and divided into five stages by means of horizontal baffles 16. A vertical shaft 17 bearing blades 18 is disposed centrally of vessel 14 as an agitator. Polymerization occurs in reactor 12 at a temperature between 50 and 100° C. and the polymer solution passes from stage to stage by overflowing between the baffles 16. The polymer solution passes from the reactor by line 19 to a sodium removal section 20. This is accomplished by passing the polymer solution through a bed of Attapulgus clay or preferably through a rotary filter, such as the Oliver filter, coated with the clay as described in U.S. Patent No. 2,862,982, supra. The filtered polymer solution is then fed to a separating unit 22 by line 23 where Varsol solvent, ether and alcohol are stripped off and recycled to the reactor through line 24. Liquid polymer is removed through 25 and is ready for further processing.

By following the process as described above, 100 parts by weight of a conjugated diolefin, such as butadiene-1,3 or a mixture of 50 to 95 parts by weight of said diolefin and 50 to 5 parts by weight of styrene may be polymerized in a multistage once-through continuous process in the presence of a finely divided alkali metal catalyst, such as sodium, potassium, lithium, caesium or rubidium.

The diluents suitable for use in this invention are essentially aliphatic hydrocarbons, such as naphtha (boiling 90 to 120° C.) or straight-run mineral spirits such as Varsol (boiling 150–200° C.) but butane, pentane, benzene, toluene, xylene, cyclohexane, butenes, pentenes, Solvesso 100 (a mixture of aromatic hydrocarbons boiling 150 to 175° C.), Solvesso 150 (a mixture of aromatic hydrocarbons boiling 190 to 210° C.) or similar inert hydrocarbons are also usable, alone or in admixture. It is also desirable to include a substantial amount of certain ethers having 2 to 8 carbon atoms as codiluents or reaction modifiers. Suitable ethers include aliphatic ethers, such as diethyl ether, vinyl isobutyl ether, and cyclic ethers such as dioxane-1,4 and other cyclic ethers having the oxygen atoms separated by at least two carbon atoms. While the use of these ethers is desirable they are not indispensable to the reaction. Their presence enables a more reproducible product to be obtained and also results in the preparation of a very light or almost colorless product. When color is no problem these ethers may be omitted. The ethers, when used, are employed in amounts ranging from about 1 to 100 parts, preferably 5 to 50 parts, by weight per 100 parts of monomers.

It is also advantageous to use about 10 to 50%, preferably 10 to 30 weight percent (based on catalyst) of a $C_2$ to $C_5$ alcohol in the recipe, e.g. ethanol, isopropanol, isobutanol, isopentanol, secondary butanol and tertiary butanol.

The reaction time and introduction period vary depending on the degree of catalyst dispersion, reaction temperature, purity of feed materials and whether or not an ether and/or an alcohol are present during polymerization. The catalyst particle size should be about 1 to 100, preferably 20 to 40 microns. It is usually fed to the reactor as a slurry in 2 to 200 parts by weight of a hydrocarbon diluent, which may or may not be the same as the reaction diluent.

In accordance with this invention the molecular weight of the polymer being formed in vessel 15 is controlled by the addition of 50 to 30,000 p.p.m. of hydrogen based on monomers through line 21. In order to be effective the hydrogen must be dissolved in the liquid phase in the reaction zone. Conditions must be maintained in the reactor so that from 10 to 10,000 p.p.m. or more of hydrogen based on monomers is dissolved in the reaction medium. Any hydrogen pressure may be used up to that at which extensive hydrogenation of the monomers occurs but preferably will not exceed 250 p.s.i.a. In the case of gaseous monomers containing inert gases or where gaseous inerts are formed during the reaction which inerts built up in the polymerization system as the monomer polymerizes and hence alter the concentrations, it may be desirable to maintain a constant monomer and hydrogen pressure (a greater total pressure) or to sparge out the inert gases from the system along with part or all of the hydrogen and then add fresh hydrogen. After the polymerization reaction is complete, the unreacted hydrogen may be recovered and re-used as such or after purification. Hydrogen or its ordinary isotopic mixtures may be used in accordance with this invention, as for example, hydrogen enriched in deuterium. Mixtures of hydrogen and inert gases such as nitrogen may also be used.

The following examples will illustrate the process of polymerizing conjugated diolefins in accordance with the invention.

Example 1

Butadiene, 100 parts by weight, dioxane, 20 parts by weight, isopropyl alcohol, 0.2 part by weight, heptane, 100 parts by weight, and sodium dispersion, 1.5 parts by weight, were charged to a batch reactor at 122° F. and reaction was continued until the monomer was consumed. The reactor was blanketed with hydrogen as indicated and the following results were obtained:

| Butadiene, g. | Hydrogen, p.p.m. (on monomer) | Grams Monomer (converted/g. Na) | Viscosity (Gardner) | Mol. Wt. |
|---|---|---|---|---|
| 123.6 | None | 39.7 | 3.4 | 3,800 |
| 117 | 1,581 | 37.9 | 1.5 | 2,800 |

The drop in molecular weight is definitely associated with the hydrogen addition, since the monomer conversions per gram of sodium are essentially equal.

Example 2

The above pilot techniques were applied to commercial size continuous operations basically using the flow plan as previously described. In this series of tests, butadiene was introduced with the first stage, together with dioxane, isopropyl alcohol, heptane and sodium. The reactor was blanketed with a mixture of hydrogen, methane and nitrogen, with the methane and nitrogen acting as inert carriers for the active hydrogen. The concentration of blanket gas was such that the hydrogen concentration was 1000 p.p.m. based on butadiene added. At a later time during the commercial operations, the blanketing gas was changed to pure inert gases consisting mainly of nitrogen. The following results were obtained:

| Condition | Butadiene Conversion, percent | Resulting Polymer | |
|---|---|---|---|
| | | Viscosity (Gardner) | Mol. Wt. |
| No hydrogen | 85 | 2.0 | 3,100 |
| 1,000 p.p.m. hydrogen | 88 | 1.0 | 2,400 |

These data show that the process is equally applicable to commercial continuous processes as to batch.

The advantages of the present invention having thus been fully set forth and specific examples of the same given, what is claimed as new and useful and desired to be secured by Letters Patent is:

1. In a process for the polymerization of a conjugated diolefin in the presence of an alkali metal catalyst, the step of adding hydrogen to the polymerization system in an amount sufficient to control the molecular weight of the resulting polydiolefin.

2. The process of claim 1 in which the diolefin is butadiene and the alkali metal is sodium.

3. In a process for producing a liquid polymer oil which comprises charging a mixture of 50 to 100 parts of conjugated diolefin, 50 to 0 parts of a vinyl aromatic hydrocarbon, about 1 to 100 parts of an ether having 2 to 8 carbon atoms chosen from the group of alkyl ethers and cyclic diethers having the oxygen atoms separated by at least two carbon atoms and about 1.0 to 2.0 parts by weight of finely divided alkali metal catalyst, all based on monomers, to a reaction zone, the step of controlling the molecular weight of the polymer by dissolving hydrogen in an amount of 10 to 10,000 p.p.m., based on monomers, in the monomers in the reaction zone.

4. The process of claim 3 in which the diolefin is butadiene, the vinyl aromatic hydrocarbon is styrene, the ether is dioxane and the catalyst is sodium.

5. In a process for producing a liquid polymer oil which comprises charging a mixture of 50 to 100 parts of conjugated diolefin, about 1 to 100 parts of an ether having 2 to 8 carbon atoms chosen from the group of alkyl ethers and cyclic diethers having the oxygen atoms separated by at least two carbon atoms and about 1.0 to 2.0 parts by weight of finely divided alkali metal catalyst, all based on monomers, to a reaction zone, the step of controlling the molecular weight of the polymer by dissolving hydrogen in an amount of 10 to 10,000 p.p.m., based on monomers, in the monomers in the reaction zone.

6. The process of claim 5 in which the diolefin is butadiene, the ether is dioxane, and the catalyst is sodium.

References Cited

UNITED STATES PATENTS 3,058,973  10/1962  Greenwell _____ 260—94.2 X

DELBERT E. GANTZ, *Primary Examiner.*

C. R. DAVIS, *Assistant Examiner.*